Sept. 15, 1925.

A. KATZINGER 1,553,617

DRAWN BAKING PAN

Filed April 18, 1924

Arthur Katzinger
Inventor

Attorney

Patented Sept. 15, 1925.

1,553,617

UNITED STATES PATENT OFFICE.

ARTHUR KATZINGER, OF CHICAGO, ILLINOIS.

DRAWN BAKING PAN.

Application filed April 13, 1924. Serial No. 707,436.

*To all whom it may concern:*

Be it known that I, ARTHUR KATZINGER, a citizen of the United States, residing at Chicago, in the county of Cook and State of Illinois, have invented a new and useful Improvement in Drawn Baking Pans, of which the following is a specification.

This invention relates to pans used for baking bread, cake and similar materials used ordinarily by the wholesale baker, but obviously the same construction is equally effective for domestic cooking purposes, and for a number of other uses which will be mentioned later.

The object of this invention is to provide a simple, more sanitary and more satisfactory baking pan than is now available. Other objects will be obvious from the description, drawings and following portions of this specification.

Figure 1:
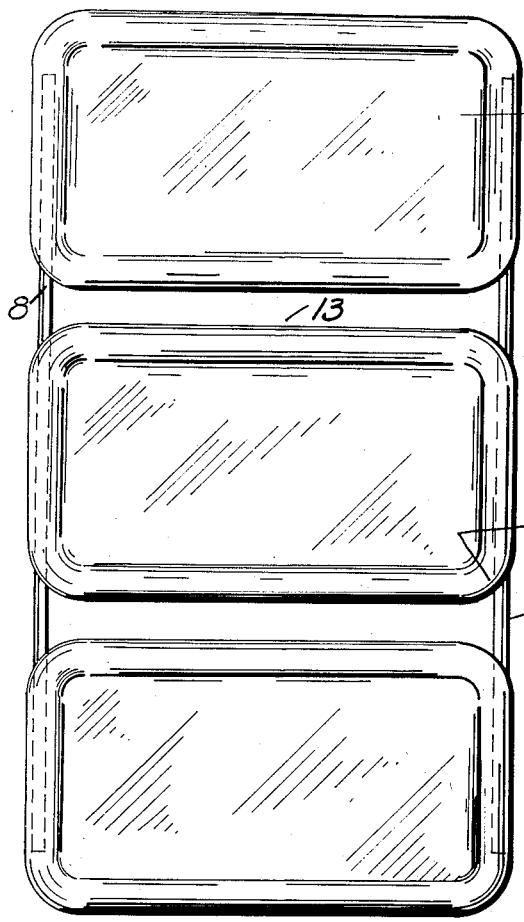

Referring to the drawings, Figure 1 shows a plan view of a series of three pans made in accordance with my invention.

Figure 2:
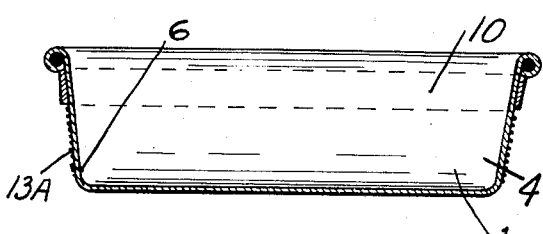
Figure 3:
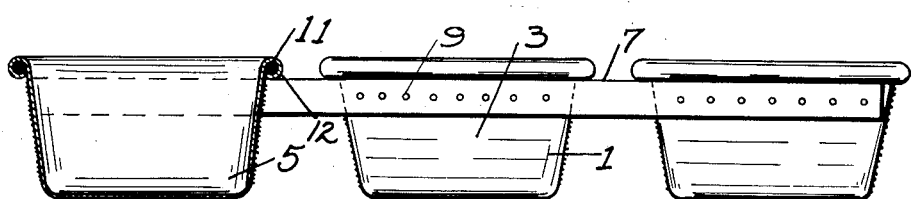

Figure 2 shows a side elevation, while Figure 3 shows an end elevation partly in section.

On the drawing (1) represents the pan, which is composed of bottom member (2) and sides (3 and 4). The sides and bottom are connected by radii (5 and 6). Sides (3 and 4) are inclined from the vertical by an angle roughly represented by the amount of ¼ inch flare on a dip of 2½ to 3 inches.

The pans are held together in a set by straps (7 and 8) which pass along the ends (3) of the pans. Straps (7 and 8) are spot welded to the ends (3) of the pans in a multiple mumber of points, as indicated at spotweld (9). Additional side straps (10) are frequently employed on the outer exposed sides of the pans.

The pans (1) are drawn from a single piece of metal, such as tin plate, and are free from laps, folds joints, seams, etc. The upper edges (11) of the pans are individually rolled over around a reinforcing wire (12) which serves to strengthen the upper edges.

The pans are spaced apart a predetermined distance (13) to permit circulation of heated air currents between the pans when in service.

It will be noted that in Figure 2 the outside walls are shown with a roughened edge, as indicated by reference #13. The bottom portion is shown smooth. This is merely a diagrammatic method of indicating the difference in heat absorption between the two surfaces, and is not to be taken as indicating that one surface is necessarily rougher than the other, or that the difference is confined only to the outside wall, as I may prefer to apply the different surface condition to the inside wall only, to the outside wall only, or to both the inside and outside of the wall.

The pans as drawn in this manner have a relatively dull finish in the tin plate of the sides, and a relatively bright or reflecting finish on the tin plate of the bottom. Such an arrangement of finish is highly desired in the baking of bread, in that it has been found that the bright finish bakes the surface adjacent to it more slowly than the dull finish, owing probably to the greater reflection of heat and the smaller absorption of heat by the bright surface. On the other hand, a dull surface bakes the material next to it more rapidly owing to the greater absorption of heat, and therefore the maintenance of a slightly greater temperature. As a result of this condition, the pans which I have invented serve to retard the baking of the bread on the under side which is next to the hearth of the oven and therefore normally hottest. Owing, however, to the dull finish on the sides of the pan, the sides of the loaf are baked more rapidly than usual. Since it is a common defect to have the bottom or under side of a loaf of bread over done and the sides of the loaf under done, it will be apparent that the pan which I have invented overcomes this difficulty and tends to produce a loaf which is quite uniformly baked on all sides. The dull finish and the bright finish, respectively, result from the stretching and drawing of the sides and the fact that the bottom is of course unaffected by this stretching.

It will be apparent that the dull finish and the bright finish may be obtained in many different ways, and I claim as my invention a pan provided with the finishes here described independently of the manner in which these finishes are produced. Any of the well known methods of producing a dull surface or of making a bright surface may be employed, as the surface finish is the important feature of my invention, and not the method of obtaining it.

For example, the dull finish may be obtained by sanding the surface with a sand blast or other desired means. The bright finish may be made by polishing the surface. The bright finish may be obtained by tinning the surface and the dull finish may be obtained by omitting the tin or by stretching the tinned surface. The dull finish may be obtained by acid or other etching treatment on a bright surface. The relative dull and bright finish may be obtained by leaving one surface in its natural condition and treating the other to obtain a bright finish or a dull finish as desired. It will be apparent that these methods are well known to those skilled in the art, and therefore do not require detailed description.

I have found that the surface here described can to advantage be applied to both the inside and outside of the pan. I prefer to have the outside surfaces of the pan show the condition which has been described, but I do not wish to confine my invention to a condition of the outside surface alone.

I have been engaged in the manufacture and sale of bake pans for many years, and to my knowledge no pans of this type have been developed or used. The pan which is in almost universal use today is the type made by folding up a sheet of tin plate much as a sheet of paper would be folded. As a result of the folded construction, the four corners of the pan represent seams or laps which serve as a ready place for the collection of grease, dirt and impurities. On the other hand, the ends of present commercial pans as a result of the folded structure have treble the thickness of the sides of the pans. This additional thickness of course results in a slower baking at the ends owing to the slow rate at which heat is transferred through the ends of the pan to the products within. Further, the folded ends are a constant liability owing to the possibility of opening up, breaking, cracking, and other obvious troubles. All of these defects are of course eliminated in the drawn pan which I have invented.

Further, the present commercial type of pans, by reason of the necessity for nesting the pans in shipment and handling, require a taper of at least ½ inch to each 2½ inches to 3 inches of depth, while the pans which I have invented may be readily nested when having only ¼ inch taper for the same depth. It is the universal desire of bakers to produce loaves having as little taper as possible, that is, having sides which are nearly perpendicular. Loaves of this kind not only present a more attractive appearance and therefore find readier sale, but are much easier to handle in the automatic wrapping machines which are now almost universally used by all large bakeries.

In using present pans which are provided with folded ends having creases and relatively sharp radius bends, it is necessary to spend a considerable amount of time, labor and material in keeping these pans thoroughly greased. The object of the greasing of course is primarily to prevent sticking of the products to the pan, to facilitate easy removal and indirectly to reduce the labor of cleaning the pans. The labor and material cost of greasing pans today is a very appreciable item in the cost of bread manufacture. On the other hand, in the pan which I have invented, by reason of the relatively large radius at points 5, 6 and 14, as well as the smooth sides, ends and bottom, the elimination of folds and crevices, it is possible to largely eliminate grease, thus not only saving the cost of this operation but at the same time making a more satisfactory product, since a large portion of the grease which is placed in the pans ultimately is absorbed by the product itself, producing a fried and wholly undesirable effect in the surface of the baked product.

Even with the thorough greasing and constant attention which is common to present pans with the folded ends, defective loaves are of frequent occurrence, partly because of the sticking of the product to the pans, partly to the deforming of the product, partly because of ununiform baking, and numerous other causes which will be obvious.

It will of course be apparent that the pan which I have invented is much easier to clean than the present folded or seamed pan, owing of course to the elimination of all crevices, corners, joints, etc., as well as to the provision of a larger radius at all corners of the pan.

Owing also to the rugged construction, elimination of seams, joints, etc., the pan which I have invented has much greater strength and resistance to deformation, and thus a longer life. Further, the pan which I have invented is economical to make and to use, and presents an extremely attractive appearance.

The pan which I have invented may be used either singly or in units without departing from the spirit of this invention. In practically all manufacturing establishments this pan is used in units ranging from 3 to 8 or 10 pans in a unit, which are rigidly strapped together. I do not wish to limit this invention to any specific number of pans in a unit. In carrying out this invention I have found that tin plate is a most generally desirable material. I do not wish to be restricted to tin plate, as obviously many other substances can be used for special occasions. Tin plate, however, is easy to clean, reasonable in cost, maintains its color well, is not porous, and owing to its peculiar surface condition, as well as to the shape of the pan, requires little greasing. Tin plate is also a relatively strong, hard material, owing of course to the steel sheets used. On the other hand, aluminum, for example, has almost opposite properties to those listed above. Nickel, Monel metal and various other alloys with which I am familiar, offer various objections and do not possess the advantages of tin plate, and in addition of course are relatively much more expensive, thus seriously increasing the cost of the finished article.

While the pans which I have invented are intended primarily for use in baking bread, cake and related articles, yet I do not wish to restrict their application to this field, as they may be used for a great many industrial or domestic purposes without departing from the spirit of this invention.

Having now fully described my invention, what I claim as new and wish to cover by Letters Patent in the United States, is as follows:

1. A seamless, jointless bake pan drawn from a sheet of tin plate and finished with a heat reflecting surface on its bottom portion and a heat absorbing surface on its sides.

2. A seamless, jointless bake pan provided with a shiny surface on its bottom portion and a dull surface on its side portions.

3. A bake pan formed from a sheet of tin plate and finished with a heat reflecting surface on the outside of the bottom portion and a heat absorbing surface on the outside of the side portions.

4. A bake pan provided with a shiny outer surface on its bottom portion and a dull outer surface on its side portions.

ARTHUR KATZINGER.